(12) United States Patent
Dellarosa (10) Patent No.: US 6,269,806 B1
(45) Date of Patent: Aug. 7, 2001

(54) INTAKE AND EXHAUST DEVICE WITH MULTIPLE SECTIONS OF SPECIFIC GEOMETRY, FOR INTERNAL COMBUSTION ENGINES

(75) Inventor: Stefano Dellarosa, Rimini (IT)

(73) Assignee: Centro Richerche Tecnologiche S.r.l., Rimini (IT)

( * ) Notice: Subject to any disclaimer, the term of this patent is extended or adjusted under 35 U.S.C. 154(b) by 0 days.

(21) Appl. No.: 09/117,330

(22) PCT Filed: Nov. 24, 1997

(86) PCT No.: PCT/EP97/06554

§ 371 Date: Sep. 21, 1998

§ 102(e) Date: Sep. 21, 1998

(87) PCT Pub. No.: WO98/23854

PCT Pub. Date: Jun. 4, 1998

(30) Foreign Application Priority Data

Nov. 28, 1996 (IT) .................................. F096A0027

(51) Int. Cl.[7] .................................. F02M 29/00
(52) U.S. Cl. .................................. 123/590
(58) Field of Search ..................... 123/590, 184.53, 123/184.56, 188.14

(56) References Cited

U.S. PATENT DOCUMENTS

| | | | |
|---|---|---|---|
| 1,788,337 | * 1/1931 | Scott | 123/590 |
| 3,414,242 | * 12/1968 | Bouteleux | 123/590 |
| 3,826,235 | * 7/1974 | Pasbrig | 123/590 |
| 3,998,195 | * 12/1976 | Scott | 123/531 |
| 4,295,458 | * 10/1981 | Pellerin | 48/189.4 |
| 4,492,212 | * 1/1985 | Dooley | 123/590 |
| 4,543,918 | * 10/1985 | Ma | 123/184.42 |
| 5,097,814 | * 3/1992 | Smith | 123/590 |
| 5,482,079 | * 1/1996 | Bozzelli | 123/590 |
| 5,590,523 | * 1/1997 | Fox | 60/307 |
| 5,769,062 | * 6/1998 | Antao | 123/590 |

FOREIGN PATENT DOCUMENTS

| | | | |
|---|---|---|---|
| 1914859 | 10/1970 | (DE) | F02B/27/00 |
| 3734616 | 4/1989 | (DE) | F01N/7/02 |
| 818457 | * 9/1937 | (FR) . | |
| 478575 | 1/1938 | (GB) . | |

* cited by examiner

Primary Examiner—Marguerite McMahon
Assistant Examiner—Jason Benton
(74) Attorney, Agent, or Firm—Steinberg & Raskin, P.C.

(57) ABSTRACT

A device for optimizing the efficiency of an internal combustion engine of the type having at least one cylinder within which a piston moves. The cylinder receives an air-fuel fresh gas mixture via an intake system or channel incorporating at least one intake valve. From the cylinder, spent gas emerges and is fed to an exhaust pipe via an exhaust system or channel. The channel incorporates at least one exhaust valve. Within one of the channels where the spent gas moves, the gas passage section is adjustable so as to modify the velocity and pressure of the gas flow directed toward the cylinder and exhaust pipe.

16 Claims, 8 Drawing Sheets

INTAKE AND EXHAUST DEVICE WITH MULTIPLE SECTIONS OF SPECIFIC GEOMETRY, FOR INTERNAL COMBUSTION ENGINES

FIELD OF THE INVENTION

This invention relates to a device applied to an internal combustion engine in accordance with the introduction to the main claim.

BACKGROUND OF THE INVENTION

As is well known, internal combustion explosion engines, particularly four-stroke engines, have the drawback of not achieving satisfactory volumetric efficiency at each engine r.p.m. because of various phenomena, mainly the low pressure in the intake duct, the low quantity of fresh gas pushed into the cylinder, and the presence of residual spent gas therein. As a consequence, an irregular power curve is generated, with non-optimum power regulation.

This problem, much felt by the expert, has been confronted by providing the engine with turbo-compressors, supplementary flap valves, variable timing diagrams, ducts of variable length, throttle controls which open and close one and then another intake duct, megaphone exhausts, exhausts with resonance chambers, supplementary electronically controlled exhaust valves, etc. The results, nearly always obtained by costly and technically complicated arrangements, in all cases leave considerable room for improvement. In this respect, technological progress has meant that very high maximum power levels are reached at high r.p.m., to the detriment of the power at low r.p.m. Moreover, and in particular, this power is delivered irregularly and with high specific fuel consumption.

In addition to the aforesaid it must be noted that the search for improved performance by the expert can lead to an exaggerated increase in the cross-sections of the intake and exhaust ducts, producing the opposite effect to that required. In this respect, by enlarging these ducts beyond a certain limit, the velocity of the gas column is reduced, with consequent throughput reduction.

German Patent Publication No. DE 1 914 859 describes a tubular body suitable to be located between the engine and the carburetor and containing within it an internal element which is substantially barrel shaped. At its end which is directed towards the engine, the element has a funnel-shaped cavity wherein a conical element is located. The conical element's apex is directed towards the engine. According to the prior art, the known solution affects the gas flow which is directed towards the engine and also the flow of the gas which, already undrawn by the engine, is repelled by the piston during the first stage of its upward movement into the cylinder (when the intake valve is closing but is still opened).

The known device is used along an intake channel and it is not described nor is its operation along an exhaust duct suggested. It is always external to the exhaust duct and its use modifies the length of the intake system with the consequences which are explained below. This device does not create more than one (annular) duct portion within the tube where the barrel-shaped element is located. Hence, though its reduces the tube's cross-section, due to its location along the path of the gas threads towards the engine, it operates as an-obstacle to the gas flow. In fact, the barrel-shaped element slows down the quickest gas threads located along the longitudinal (central) axis of the tube by deviating them against the tube wall where, due to the friction with the tube wall, they slow down. There is no dragging effect on the slowest gas threads into the gas flow towards the engine and therefore the velocity of the flow is reduced and as a consequence the flow rate and the filling of the cylinder are reduced.

French Patent No. 818,457 describes devices which, according to the prior art, allow a better flow of the exhaust gas towards an exhaust channel. This prior art describes only this use (in an exhaust channel) but neither describes nor suggests the use of such devices in an intake duct FR 818,457 describes annular elements, freely located (excepted for the last element which is fixed) inside a channel. Each element has a jacked abutting on the channel wall and a central hole through which the exhaust gas flows.

Each of these elements restricts the channel cross-section, and also creates only one free section or portion wherein the gas flows. Therefore, during its path towards the exhaust the gas flow is slowed down by the jackets of the annular bodies which negatively affects the exhaust speed of the gas from the cylinder and therefore the engine performance.

Furthermore, the above bodies tend to cool the gas as it flows and this contributes to the slowing down the flow with obvious consequences on the emptying of spent gas from the cylinder.

British Patent No. 478,575 relates to a device to expedite and facilitate the discharge of the exhaust gases form internal combustion engines. This is obtained by arranging in the collector or chamber at or near the transition zone from the exhaust pipe or pipes to the collector or chamber, a series of aerofoils or slotted aerofoils, the arrangements being such that the gases passing over the surface of the aerofoils at high speed create a depression or vacuum within the collector or chamber which tends to draw the gases out of the exhaust pipe or pipes opening into the collector or chamber.

In this prior art reference, the aerofoils are located outside any exhaust pipe and is neither described nor suggested their location inside the pipe or within an intake duct. Furthermore, the aerofoils (which are alternate solid parts) are located within a body to which the above pipe is connected and which has a relatively large dimension. In view of this, the known solution could never be used in a modern compact engine.

German Patent Publication No. DE 37 34 616 describes the location, within a conical body connected to an exhaust duct of a combustion engine, of a tapered element (conical body) which negatively affects the gas flow. Within the conical body, the element creates only one annular section and is fixed to the wall of the conical body; it divides the single channel for the gas in a plurality of portions (creating the annular duct) which taper in the direction of the gas flow.

This known solution is not used in an exhaust duct or intake duct and has the same drawbacks as DE 1 914 859.

OBJECTS AND SUMMARY OF THE INVENTION

An object of the invention is to provide a device for overcoming the aforesaid drawbacks.

A particular object of the invention is to provide a device which enables an internal combustion engine volumetric efficiency to be achieved which is satisfactory at each engine r.p.m.

A further object is to provide a device which at each engine r.p.m. enables a higher power to be achieved than known engines of equal displacement, with lesser fuel consumption and with lesser pollution than these latter.

These and further objects which will be apparent to the expert of the art are attained by a device for varying the section of an induction or intake duct or of an exhaust duct of an internal combustion engine in accordance with the accompanying claims.

By means of the device of the invention, the intake or exhaust duct is given a specific geometry which for equal values (given by the sum of its cross-sections) and for equal suction or compressive forces, determines a greater gas velocity and hence a greater throughput than known ducts.

The consequent effects can be summarized as follows:

better air-fuel mixing;

increase in the throughput and density of the intake fresh gas charge;

increase in the expelled spent gas flow;

better volumetric efficiency at each engine r.p.m.;

increase in power;

increase in torque;

reduction in fuel consumption;

reduction in pollution.

When suitably positioned in the induction system (upstream of the intake valve), the device of the invention, described hereinafter in detail, makes it easier for fresh gas to enter the cylinder with greater density and velocity, so achieving greater dynamic supercharging. The consequent greater pressure impressed on the gas column (air-fuel mixture) not only increases volumetric efficiency but also opposes the "refusal" phenomenon of the fresh gas due essentially to the upward movement of the piston with the valve still partly open, particularly at low and medium engine r.p.m. In this manner a permeable ("transparent") duct is obtained for the air-fuel mixture directed towards the cylinder, and a more impermeable (braking) duct for the refusal gas which returns to this latter.

If instead the device of the invention is positioned in the exhaust system, downstream of the relative valve, it enables the spent gas velocity to be increased towards the free air, particularly after the first spontaneous exhaust stage, so creating greater vacuum for better cylinder emptying, and reventing residual spent gas returning to it by known phenomena. All this results in a higher filling coefficient at each engine r.p.m., giving greater power, less fuel consumption and less pollution. In this manner a more "transparent" duct is obtained for the spent gas and a more braking duct for the return gas.

The device of the invention is applicable to every type of four-stroke internal combustion engine, with more marked effects in high-performance engines such as those used in competitions.

BRIEF DESCRIPTION OF THE DRAWINGS

The present invention will be more apparent from the accompanying drawing, which is provided by way of non-limiting example and on which:

FIGS. 14, 14A, 15, 15A show further modifications of the invention.

DETAILED DESCRIPTION OF THE PREFERRED EMBODIMENTS

With reference to said figures, an internal combustion engine, of four-stroke type in the example, is indicated overall by M and comprises one or more cylinders 2 (only one of which is shown in the figures) within which a piston 1 moves in known manner. To the cylinder 2, or rather to the engine head T provided with ducts 20 and 21 connected to the cylinder 2, there are connected an induction duct 13 for an air-fuel mixture and an exhaust duct 12 for the spent gas expelled from the cylinder. At the cylinder head 2A there are provided valves 7 and 9 (known per se) each positioned in correspondence with a respective duct 13 or 12.

According to the invention, operationally associated with at least one of the induction and exhaust ducts (ie with the duct 13 and 20 or with the duct 21 and 12) there is positioned a device D arranged to modify the velocity distribution of the gas flow (fresh and exhaust) within the duct, such as to make it uniform and increase the velocity of the gas flow along the wall of the relative duct, and which would be decelerated by friction against said wall. This is achieved without reducing the throughput of said flow, by creating within the duct a plurality of useful passage sections which can have various geometrical configurations. Modifying the useful section for the gas (fresh or exhaust) results in a variation in its transit velocity through the duct and in the pressure therein. This results in improved filling of the cylinder 2 if the device D is associated with the induction or intake duct 13 and 20, or if said device D is associated with the exhaust duct 12 and 21 it impresses a greater velocity on the gas passing through it towards an exhaust pipe S because of a stronger vacuum generated within said duct.

Figure 2:
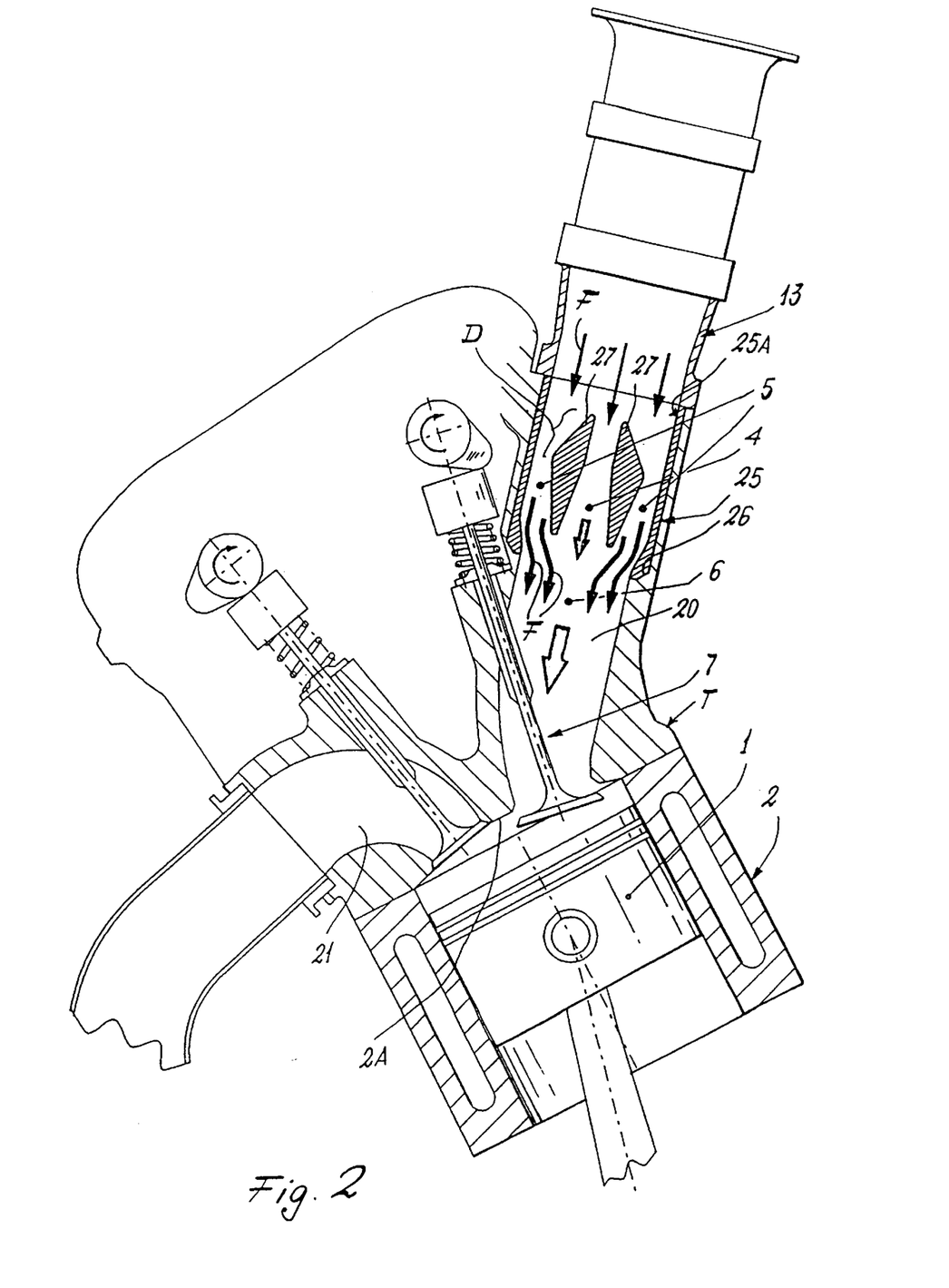
FIG. 2 s hows the device of the invention applied to the feed system or to the intake duct, this figure showing the air-fuel mixture intake stage.
Figure 3:
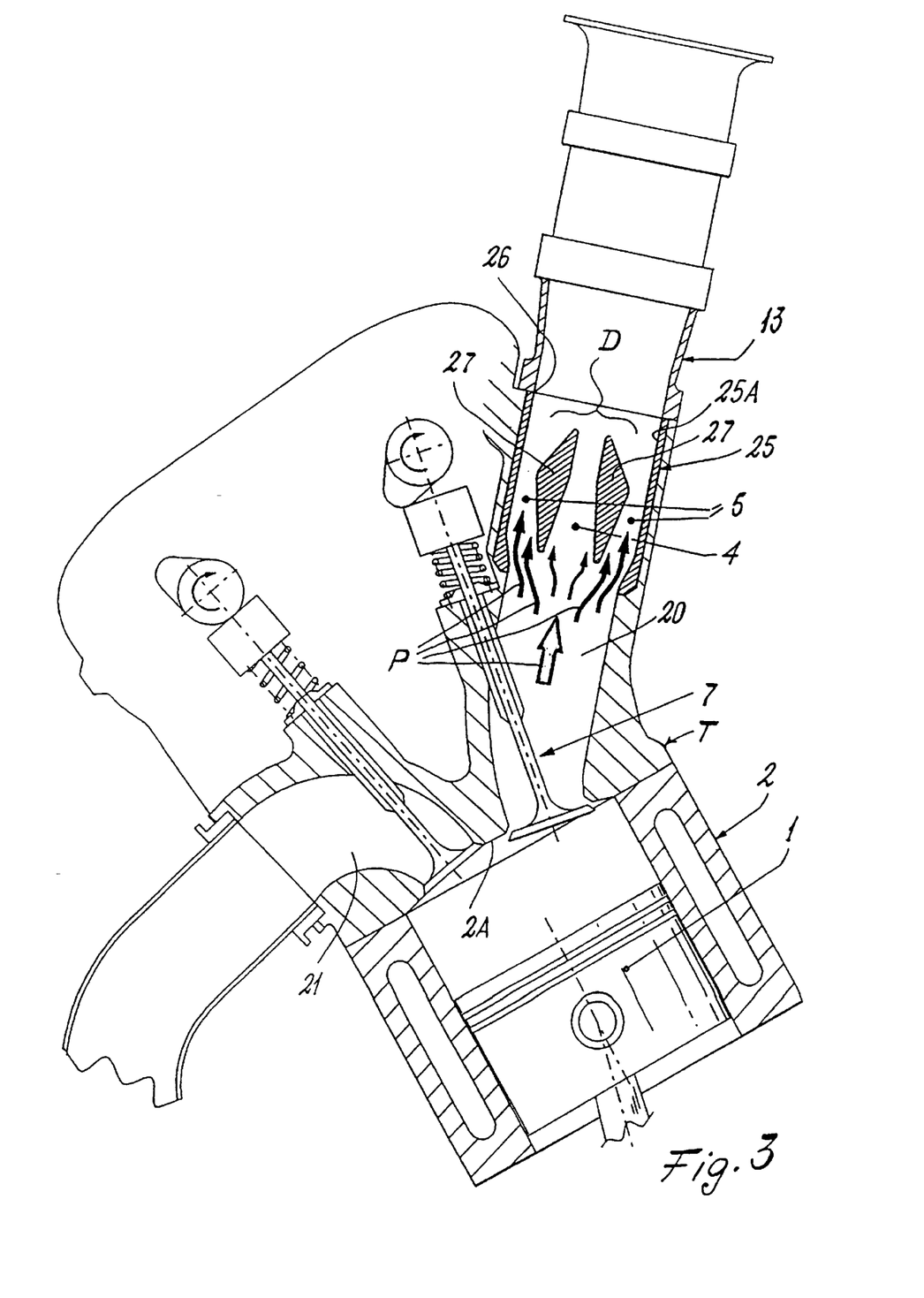
FIG. 3 again shows the device of the invention applied to the intake duct during another part of the intake stage, and in which said device decelerates and/or halts the fresh gas repelled by the piston 1, to oppose the "refusal" phenomenon.

More specifically, with reference to FIGS. 2 and 3, these show one embodiment of the device D of the invention operationally associated with the intake duct 13 (and 20). This device comprises a cylindrical or semi-cylindrical body 25 inserted into a seat 26 formed in that duct 20 of the head T connected to the exhaust duct 13. The body 25 can be formed integral with the relative seat (for example by casting), so dividing part of the duct into which it is inserted, or can be independent of this latter and be connected to it mechanically in a removable and interchangeable manner (with screws, bayonet coupling or the like) or be fixed (for example by welding).

From an inner wall 25A of said body there branch one or more elements 27 arranged to modify the useful passage cross-section of the combined intake duct 13 and duct 20 (hereinafter known as the feed/intake system or channel), so as to create section variations in the path of the fresh gas fed to the cylinder. Specifically, the element or elements 27 create a plurality of ducts or sections 4 and 5 through which the fresh gas passes before reaching the cylinder. The sections 4 and 5 can have an entry area different from their exit area. Said elements can be of different shapes and dimensions, as shown in FIGS. 6 to 13. They can be simple fins positioned with their axes incident (FIG. 6) or parallel to the axis Z of the body 25 (and hence of the duct through which the gas passes), or be actual variably sectioned pieces generating ducts 4 and 5 of such as shape as to converge (in the direction of the gaseous flow through the body 25, indicated by the arrow G) towards the axis Z (FIG. 9, FIG. 13) or to diverge from this axis (FIG. 13), or of variable shape, ie a first portion diverging from and a second portion converging towards said axis Z (FIGS. 7, 8, 10 and 11). Said elements 27 can be of hollow conical shape with through end holes (as in FIGS. 7, 9, 13) or of hollow conical shape but not holed (as in FIG. 12), or be solid but of variable section (FIGS. 10, 11), or hollow with their axis coaxial to the axis Z but with variable wall sections (as in FIG. 8).

The device D can be positioned at any point of the path of the fresh gas fed to the engine, depending on the geometry, the displacement and hence the type of engine M with which it is associated. Its position along the path, ie closer to or further from the valve 7, enables different engine responses to be obtained at different r.p.m. It can also be applied to engines operating at atmospheric pressure, or to boosted engines (with turbocompressors or positive displacement compressors), with one or more valves positioned in the intake duct 13, so improving engine efficiency.

The use of the device D in the case of FIGS. 2 and 3 is as follows: during engine operation, the fresh gas drawn into the cylinder 2 by the piston 1 passes through the body 25 (arrows F of FIG. 2) by way of each section 4 and 5 and considerably increases its velocity towards the cylinder 2, to hence generate a strong vacuum in the intake duct 13. That portion of fresh gas which stagnates or passes at low velocity through the induction duct 13 in proximity to the walls is drawn by molecular friction by the effect of the vacuum generated by the faster gas column.

The flows re-compact downstream of the body 25 in the section 6 shown in FIG. 2, and on reducing their velocity transform the accumulated kinetic energy into pressure upstream of the intake valve 7, with evident positive effects on the filling of the cylinder 2.

At the same time, that fresh gas portion repelled by the piston 1 during the first stage of its upward movement, when the intake valve 7 is still partially open, passes through the device D in the opposite direction within the converging portion of the sections 4 and 5 (arrows P of FIG. 3), to be decelerated and/or halted, not only by the greater pressure applied to the gas column but also by the particular form of the device D.

Said gas portion is then drawn into the next cycle to mix with greater uniformity with a new fresh gas charge.

The advantages of the invention, when positioned within the induction system 13, can hence be summarized as follows:

increase in the throughput and density of the indrawn fresh gas charge;

reduction in the air-fuel mixture "refusal" phenomenon at intake;

increase in engine volumetric efficiency.

Figure 4:
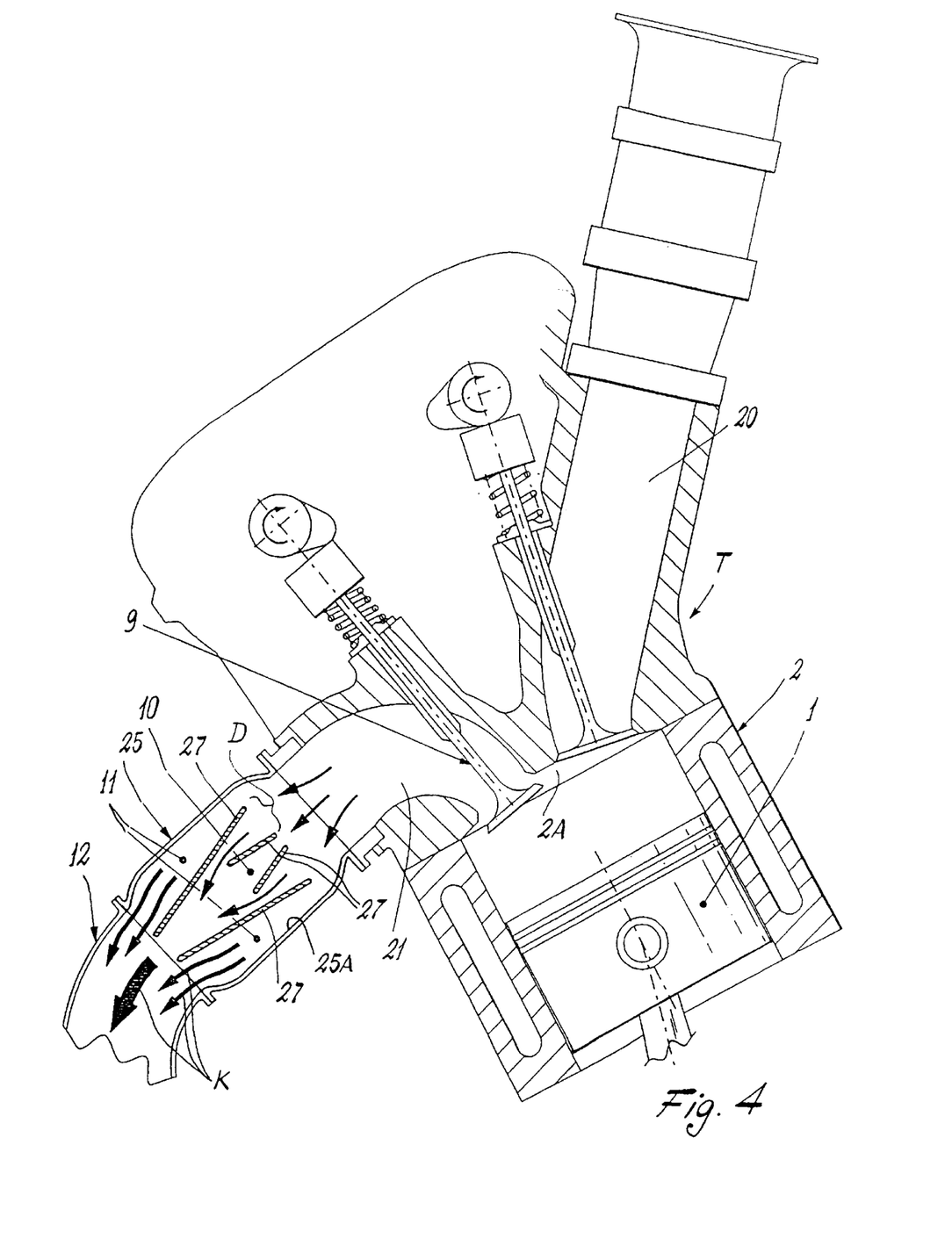
FIG. 4 shows the device of the invention applied to the expulsion system or to t he exhaust duct for the spent gas, this figure showing the exhaust stage of said gas.
Figure 5:
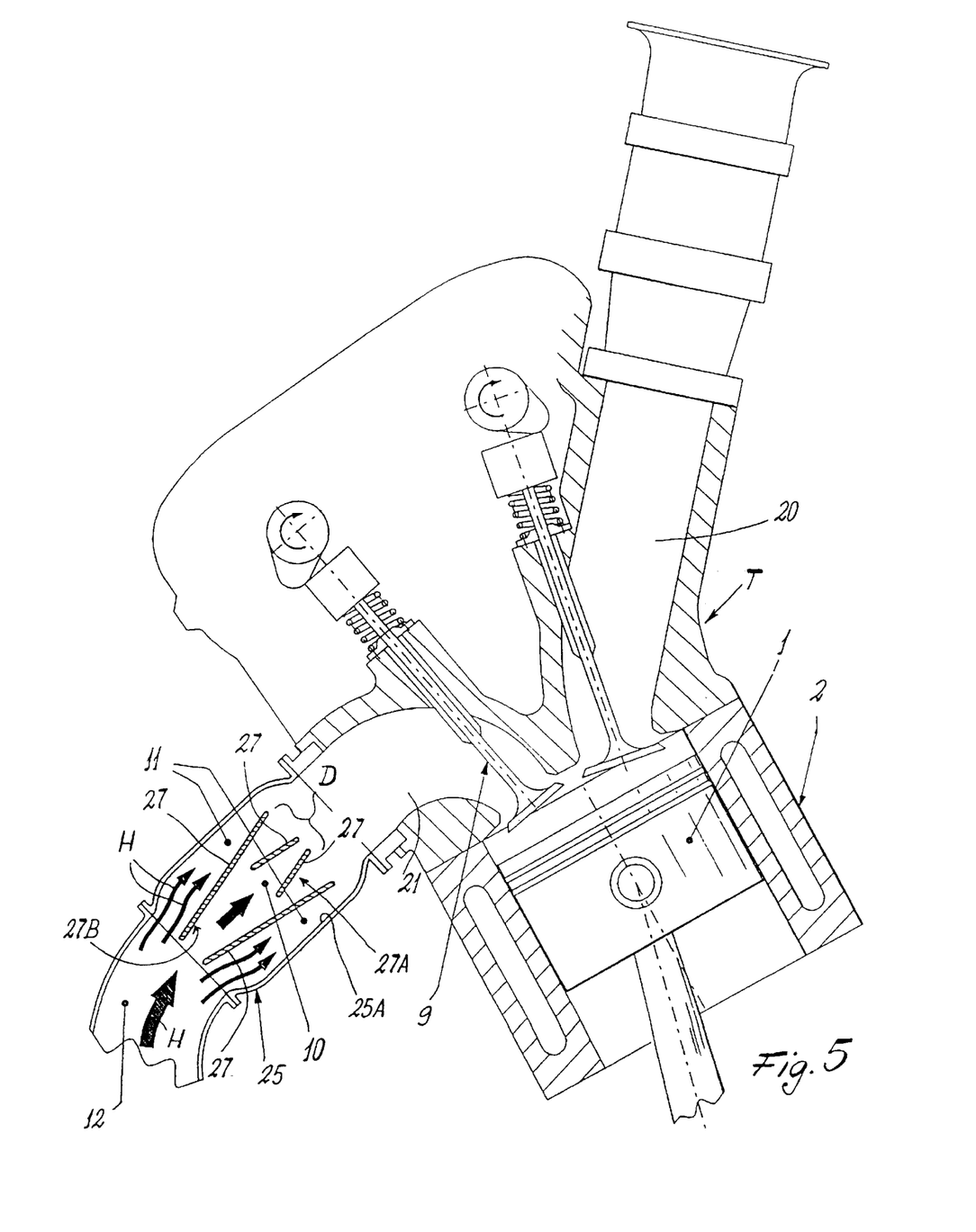
FIG. 5 shows the device of FIG. 4 and its action in decelerating and/or halting the spent gas "reflected" towards the cylinder 2.
Figures 6, 7:
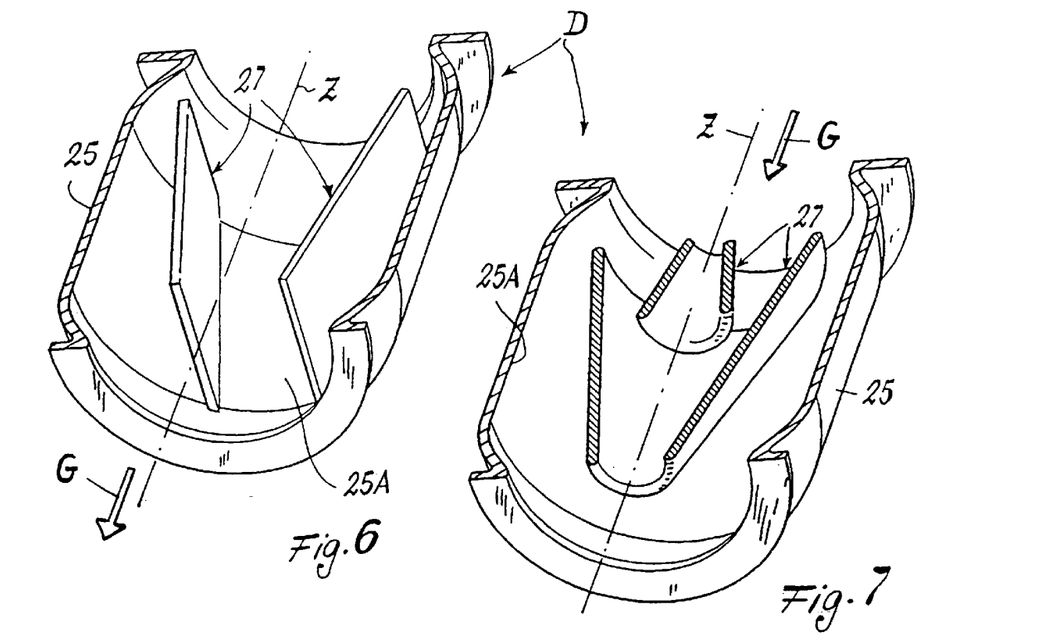
FIGS. 6—7—8—9—10—11—12—13 show some of the many implementational configurations of the device of the present invention.
Figures 8, 9:
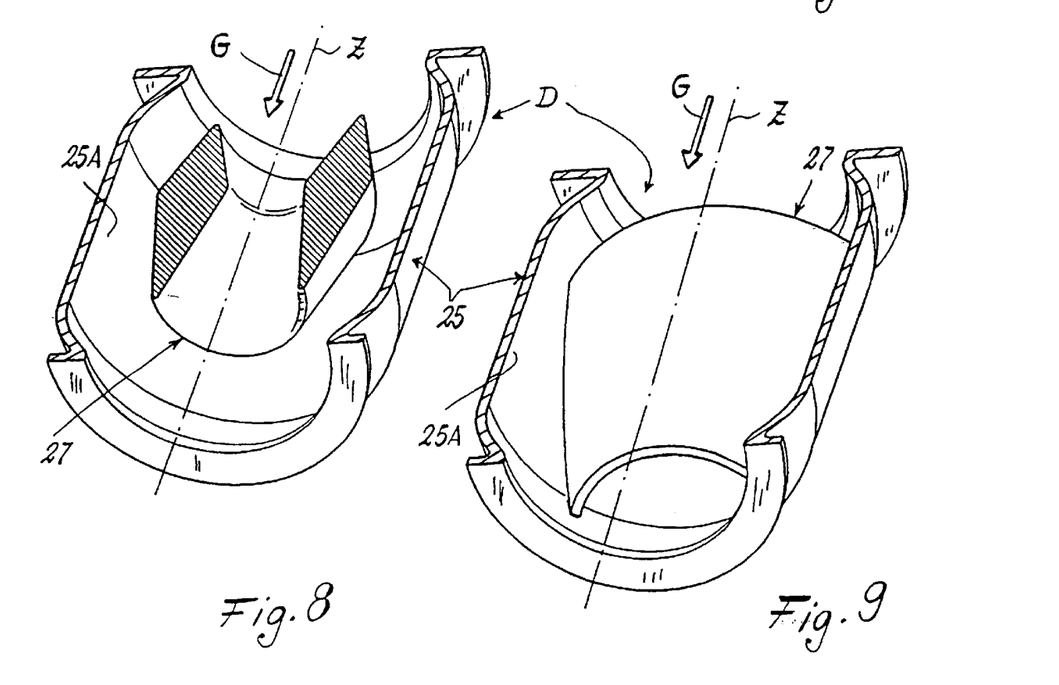
Figures 10, 11, 12, 13:
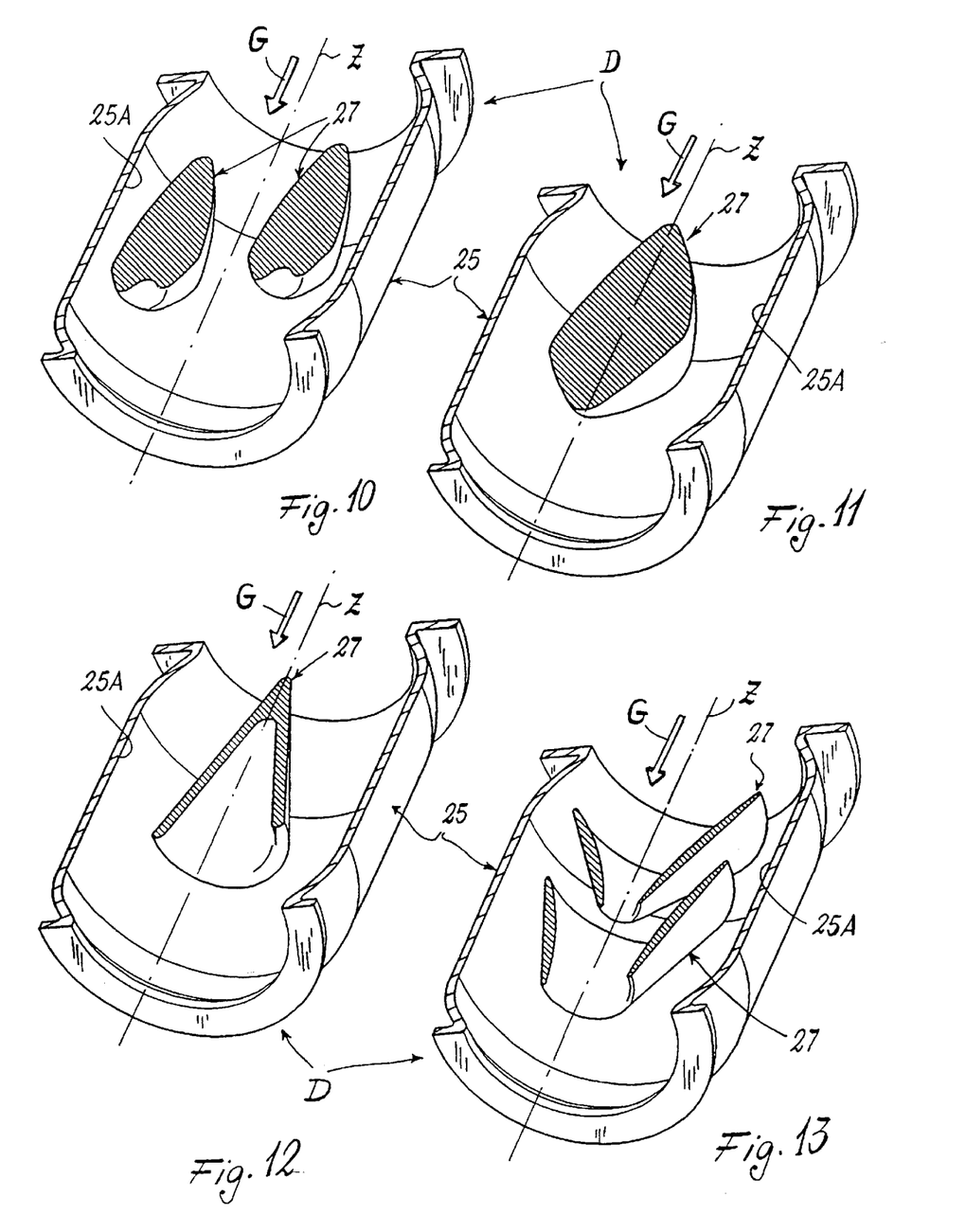

Reference will now be made to FIGS. 4 and 5 which show the application of the device D of the invention to the spent gas exhaust duct 12. The device D is totally identical to that positioned in the fresh gas passage towards the cylinder 2 as heretofore described. Consequently those parts of the device identical to those already described in relation to FIGS. 2 and 3 are indicated by the same reference numerals and will not be further described.

In the example under examination, the device D comprises a plurality of elements 27 in the form of fins arranged in pairs such as to diverge from and converge towards the central axis of the duct through which the spent gas flows. Specifically, a first pair 27A of these elements converges (in the spent gas flow direction) towards said axis, and a second pair 27B diverges from this axis. Between said elements there are created passages or sections 10 and 11 through which said gas changes its velocity, as will be indicated hereinafter. The device body 25 is associated with the exhaust duct 12 and duct 21 of the engine head (these defining the exhaust system or channel) in the manner already described in relation to the device D of FIGS. 2 and 3, and which will hence not be further described.

During engine operation, hot spent gas passes through the device D; after the initial stage of spontaneous gas evacuation from the cylinder consequent on the high initial pressure on opening the exhaust valve 9, the device D causes this gas to undergo a velocity increase towards the free air through each section 10 and 11, to hence generate a strong vacuum in the exhaust duct 12 and cylinder 2.

The residual spent gas stagnating in the cylinder and that spent gas passing through the exhaust duct in proximity to the walls are drawn by said vacuum to be also pushed downstream through the exhaust duct 12 towards the free air (FIG. 4, arrow K).

At the same time that spent gas which by known phenomena is "reflected" towards the cylinder 2 (arrows H of FIG. 5), this gas being detrimental to engine efficiency, passes through the device D from downstream to upstream through the converging portions of the sections 10 and 11, to be decelerated and/or halted by the particular form of the device.

This generates a prolongation of the spent gas extraction stage which, besides producing a more consistent emptying of the cylinder 2, facilitates its filling with fresh charge during the next cycle.

The advantages of the invention when positioned within the exhaust system 12 can hence be summarized as follows:

greater emptying of spent gas from the cylinder;

lesser contamination of the fresh gas charge;

greater volumetric efficiency.

From the aforegoing, the beneficial effects which the aforedescribed invention when positioned within the intake and/or exhaust system has on the overall engine efficiency are apparent, in that it increases engine performance while reducing fuel consumption and atmospheric pollution. In addition, its constructional simplicity makes it extremely economical, while the reliability deriving therefrom ensures a virtually unlimited life. In addition, its characteristics and advantages make this device suitable for application to any suction-compression machine.

Figure 1:
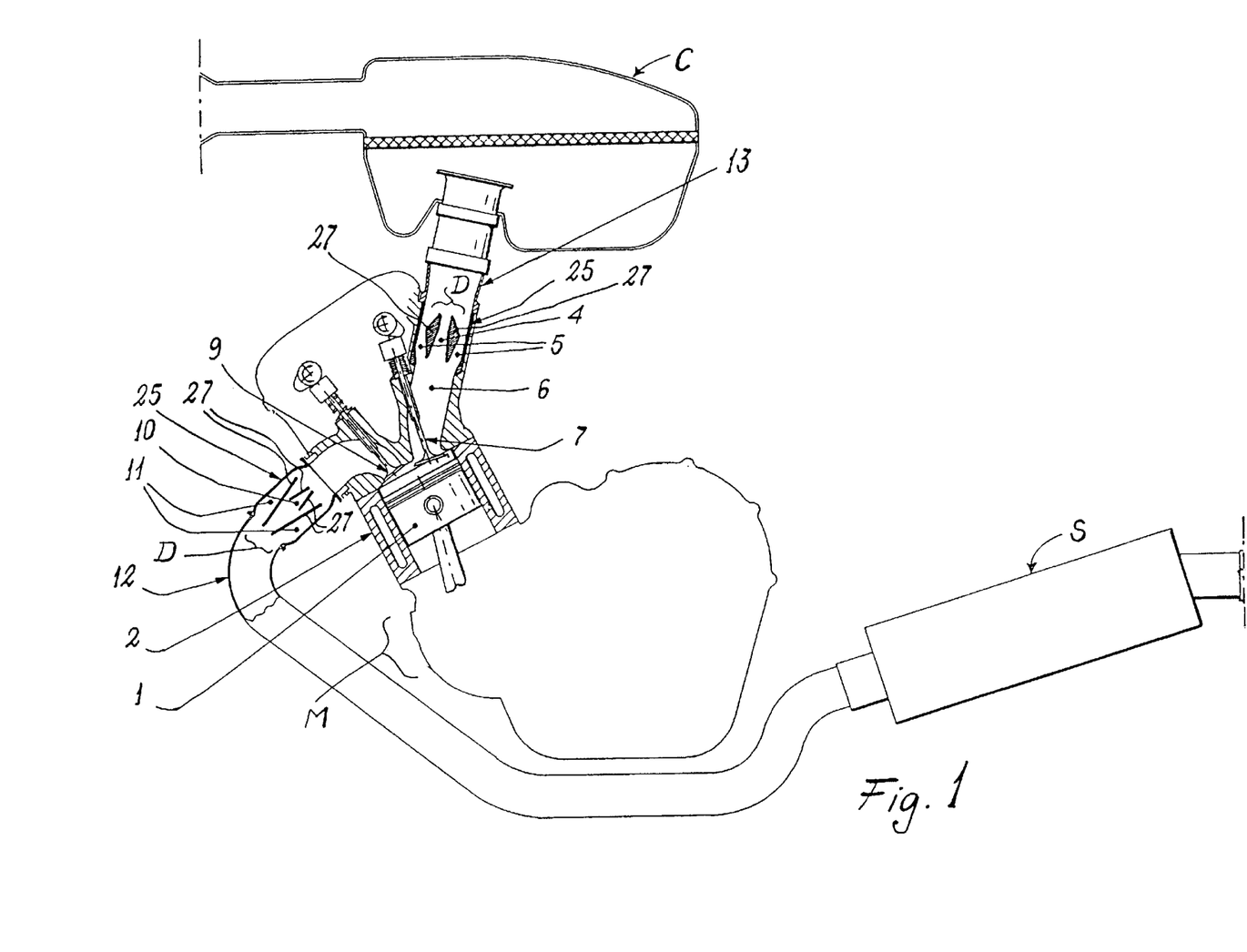
FIG. 1 shows an internal combustion engine complete with induction and exhaust system with which the device of the invention is associated in two different configurations.

In the practical embodiment of the invention, the size, the shape, the proportioning of the feed/intake system 13, 20 and of the expulsion/exhaust system 12, 21 (in the sense of an assembly extending from the valve or valves 7–9 of the cylinder or cylinders 2 to the external free air through the exhaust pipe S of FIG. 1) and the location of the elements 27 (diverging and/or parallel and/or converging and or curved portions, etc.), can be chosen at will according to requirements.

Furthermore the body 25 of the device D can be applied in different numbers, shapes and positions within the feed/intake system 13, 20 from the entry section or sections to the intake valve or valves 7, or in the expulsion/exhaust system 12, 21 from the exhaust valve or valves 9 to the exit section or sections towards the free air. It can also be applied to the vehicle dynamic intake, and to already existing engines.

Figure 14:
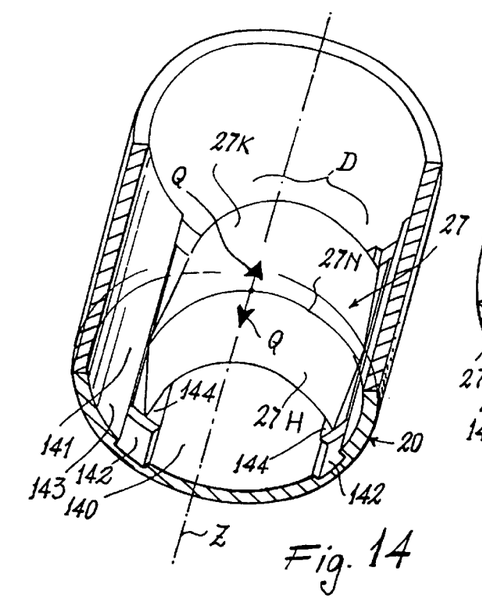

FIGS. 14, 14A show a further embodiment of the invention. These figures, in which parts corresponding to those of the already described figures are indicated by the same reference numerals, show a device D comprising an element 27 inserted directly into the intake duct 13 or 20 (as shown) or into the exhaust duct 12 or 21. In other words, the described body 25 shown in the preceding figures (for example from 6 to 13) is defined by the duct within which the element 27 is positioned.

In the example under examination, the element 27 is shaped as a body consisting of two half-cone frustums 27H and 27K, connected together at their greater-area base 27N and tapering in opposite directions. The body is hollow and divides the system in which it is positioned, for example the intake system indicated by 20, into two sections 140 and 141. In the example, the system or duct 20 is cylindrical, and the total area of said sections 140 and 141 is constant within the duct 20. If this duct should itself taper, then said area would change constantly along the axis (Z) of the duct.

According to the embodiment under examination, the element 27 is movable (arrows Q of FIG. 14) within the relative duct 20 along guides 142 provided on the inner wall 143 of this latter. For this purpose, the element 27 comprises end shoes 144 movable within the guides 142. These latter are shown rectilinear, ie parallel to said axis Z. However they can have any orientation along the wall 143.

Moving the element 27 enables it to be positioned closer to or further from the valve (not shown) located in said duct so as to modify the conditions (velocity and pressure) of the fluid directed towards the cylinder, and hence modify the engine response to the various r.p.m. If the device D is positioned in the exhaust system (for example within the duct 21) the facility for moving the element 27 towards or away from the corresponding exhaust valve enables cylinder emptying to be improved on the basis of engine r.p.m.

Its movement can be manual by moving the element 27 along the guides 142 and then fixing it in discrete positions by screws (setscrews) 150 shown by dashed lines in FIG. 14A and operable through holes 151 provided through the duct 20 (or 21). Alternatively it can be moved by a suitable actuator (mechanical or hydraulic) either operated manually or preferably controlled by a microprocessor on the basis of the engine r.p.m.

Figure 15:
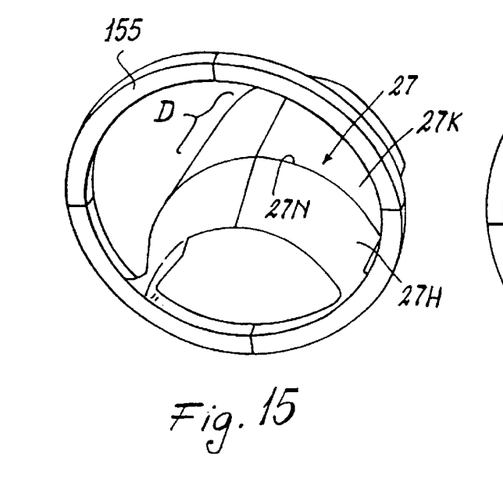

FIGS. 15 and 15A, in which parts corresponding to those of the already described figures are indicated by the same reference numerals, show a further embodiment of the invention in which the element 27 is associated with an annular support body 155 to be positioned on a step provided at the commencement of the corresponding duct 20 or 21 (not shown) or within this latter. The embodiment shown on the figures enables the element 27, by suitably choosing its length, to be positioned closer to or further from the relative valve, to achieve different engine behaviour at various r.p.m.

The embodiments shown in FIGS. 1, 2, 3, 4, 5, 6, 7, 8, 9, 10, 11, 12, 13, 14, 14A and 15A are therefore purely indicative and as such are not limitative of the process. Said embodiments are therefore not to be considered as exhaustive of the possible internal and external configurations of the multiple-section duct of the invention.

The invention can be implemented by any known technique and can also be applied to ducts of already existing engines, and to suction or compression machines.

What is claimed is:

1. An intake and exhaust device with multiple sections of specific geometry for an internal combustion engine, for the purpose of optimizing the efficiency of said engine, the engine being of the type comprising at least one cylinder within which a piston moves, said cylinder receiving an air-fuel fresh gas mixture via an intake system or channel incorporating at least one relative usual intake valve, from said cylinder there emerging spent gas fed to an exhaust pipe via an exhaust system or channel, said channel incorporating at least one relative usual exhaust valve, said device comprising sectioning means located within one of said channels where said air-fuel gas mixture moves the improvement comprising wherein said sectioning means are structured and arranged for mounting either within the intake channel or the exhaust channel, the mounting being operated without any modification of said sectioning means, the sectioning means being fixed to the selected channel;

said sectioning means structured and arranged to divide the channel where they are arranged into at least two ducts without modifying the length of the channel thereby allowing the retrofitting of said sectioning means to existing engines, said sectioning means structured and arranged to increase the transit velocity distribution of the gas flow through the channel by tending to make it uniform and speeding up the slowest gas thread by virtue of the dragging action generated on the slowest gas thread by the fastest gas threads, said sectioning means structured and arranged to maintain a turbulence level of said gas flow substantially constant, said sectioning means structured and arranged to modify the pressure and flow rate of the gas flow so as to improve cylinder filling and/or cylinder emptying, and wherein said sectioning means comprise at least an element through which the gas flows and which creates within said channel a first gas flow along said channel wall and at least a second gas flow which is directed substantially along the axis of said channel and wherein said element is at least one conical or frusto-conical element which is axially holed.

2. A device as claimed in claim 1, wherein the sectioning means are carried internally by a body separate from the relative channel with which said means cooperate said body mounted within said channel.

3. A device as claimed in claim 1, wherein the sectioning means form part of the channel within which they are positioned.

4. A device as claimed in claim 1, wherein the sectioning means are associated with an annular support element associated with the channel within which they are positioned.

5. A device as claimed in claim 4, wherein the annular support element is external to the channel and coaxial to the channel.

6. A device as claimed in claim 1, wherein the conical or frusto-conical element tapers in the direction of the gas flow through the channel in which said element is positioned.

7. A device as claimed in claim 1, wherein the conical or frusto-conical element tapers in the direction contrary to the direction of the gas flow through the channel in which said element is positioned.

8. A device as claimed in claim 1, comprising at least two hollow frusto-conical elements positioned in succession within the channel through which the gas flow passes.

9. An intake and exhaust device with multiple sections of specific geometry for an internal combustion engine, for the purpose of optimizing the efficiency of said engine, the engine being of the type comprising at least one cylinder within which a piston moves, said cylinder receiving an air-fuel fresh gas mixture via an intake system or channel incorporating at least one relative usual intake valve, from said cylinder there emerging spent gas fed to an exhaust pipe via an exhaust system or channel, said channel incorporating at least one relative usual exhaust valve, said device comprising sectioning means located within one of said channels where said air-fuel gas mixture moves the improvement comprising wherein said sectioning means are structured and arranged for mounting either within the intake channel or the exhaust channel the mounting being operated without any modification of said sectioning means, the sectioning means being fixed to the selected channel;

said sectioning means are structured and arranged to divide the channel where they are arranged into at least two ducts without modifying the length of the channel thereby allowing the retrofitting of said sectioning means to existing engines, said sectioning means are structured and arranged to increase the transit velocity distribution of the gas flow through the channel by tending to make it uniform and speeding up the slowest gas thread by virtue of the dragging action generated on the slowest gas thread by the fastest gas threads, said sectioning means are structured and arranged to maintain a turbulence level of said gas flow substantially constant, said sectioning means are structured and arranged to modify the pressure and flow rate of the gas flow so as to improve cylinder filling and/or cylinder emptying and wherein the sectioning means modifying the section of the channel consist of at least one body having a cross-section whose dimensions vary in the direction of the gas flow passing through the relative channel.

10. A device as claimed in claim 9, wherein the element of variable cross-section has parts converging towards and parts diverging from the axis of the channel wherein it is located.

11. A device as claimed in claim 1, wherein the sectioning means are fixed within the system or channel in which they are positioned.

12. An intake and exhaust device with multiple sections of specific geometry for an internal combustion engine, for the purpose of optimizing the efficiency of said engine, the engine being of the type comprising at least one cylinder within which a piston moves, said cylinder receiving an air-fuel fresh gas mixture via an intake system or channel incorporating at least one relative usual intake valve, from said cylinder there emerging spent gas fed to an exhaust pipe via an exhaust system or channel, said channel incorporating at least one relative usual exhaust valve, said device comprising sectioning means located within one of said channels where said air-fuel gas mixture moves the improvement comprising wherein said sectioning means are structured and arranged for mounting either within the intake channel or the exhaust channel, the mounting being operated without any modification of said sectioning means, the sectioning means being fixed to the selected channel;

said sectioning means are structured and arranged to divide the channel where they are arranged into at least two ducts without modifying the length of the channel thereby allowing the retrofitting of said sectioning means to existing engines, said sectioning means are structured and arranged to increase the transit velocity distribution of the gas flow through the channel by tending to make it uniform and speeding up the slowest gas thread by virtue of the dragging action generated on the slowest gas thread by the fastest gas threads, said sectioning means are structured and arranged to maintain a turbulence level of said gas flow substantially constant, said sectioning means are structured and arranged to modify the pressure and flow rate of the gas flow so as to improve cylinder filling and/or cylinder emptying and wherein said sectioning means are mounted by mounting means, within said system or channel, for permitting the movement of the sectioning means within the system or channel in which they are mounted, either along the longitudinal axis of the system or channel or about it, said mounting means being an annular ring or sleeve structured and arranged to conform to the perimeter of the channel on which said sectioning means is integrally formed with said ring.

13. A device as claimed in claim 12, wherein said movement of the sectioning means is controlled by actuator means for adjusting the position of said sectioning means, said actuator means responsive to the revolutions per minute of the engine so as to modify the relative position of the sectioning means within the corresponding system or channel along the longitudinal axis or about it in response to the revolutions per minute of the engine.

14. A device as claimed in claim 1, wherein within the respective channel, the sectioning means define gas-flow transit sections which connected together by portions which are at least partially communicating.

15. A device as claimed in claim 14, wherein the gas-flow transit sections have an entry area different from their exit area.

16. An intake and exhaust device with multiple sections of specific geometry for an internal combustion engine, for the purpose of optimizing the efficiency of said engine, the engine being of the type comprising at least one cylinder within which a piston moves, said cylinder receiving an air-fuel fresh gas mixture via an intake system or channel incorporating at least one relative usual intake valve, from said cylinder there emerging spent gas fed to an exhaust pipe via an exhaust system or channel, said channel incorporating at least one relative usual exhaust valve, said device comprising sectioning means located within one of said channels where said air-fuel gas mixture moves the improvement comprising wherein said sectioning means are structured and arranged for mounting either within the intake channel or the exhaust channel, the mounting being operated without any modification of said sectioning means, the sectioning means being fixed to the selected channel;

said sectioning means are structured and arranged to divide the channel where they are arranged into at least two ducts without modifying the length of the channel thereby allowing the retrofitting of said sectioning means to existing engines, said sectioning means are structured and arranged to increase the transit velocity distribution of the gas flow through the channel by tending to make it uniform and speeding up the slowest gas thread by virtue of the dragging action generated on the slowest gas thread by the fastest gas threads, said sectioning means are structured and arranged to maintain a turbulence level of said gas flow substantially constant, said sectioning means are structured and arranged to modify the pressure and flow rate of the gas flow so as to improve cylinder filling and/or cylinder emptying and wherein said sectioning means comprise at least an element through which the gas flows and which creates within said channel a first gas flow along said channel wall and at least a second gas flow which is directed substantially along the axis of said channel and wherein said element is at least one half-cone frustum element.

* * * * *

UNITED STATES PATENT AND TRADEMARK OFFICE
CERTIFICATE OF CORRECTION

PATENT NO.  : 6,269,806 B1
DATED       : August 7, 2001
INVENTOR(S) : Dellarosa

It is certified that error appears in the above-identified patent and that said Letters Patent is hereby corrected as shown below:

<u>Title page,</u>
Item [73], the correct spelling of the Assignee is
-- Centro Ricerche Tecnologiche S.r.L. --

Signed and Sealed this

Tenth Day of September, 2002

Attest:

Attesting Officer

JAMES E. ROGAN
*Director of the United States Patent and Trademark Office*